May 12, 1959

W. R. ABBOTT 2,886,753

DIGITAL POSITIONING SERVO

Filed May 21, 1957

INVENTOR.
WILTON R. ABBOTT

BY Allan Rothenberg

ATTORNEY,

FIG. 4

INVENTOR.
WILTON R. ABBOTT
BY
*Allan Rothenberg*
ATTORNEY

May 12, 1959 W. R. ABBOTT 2,886,753
DIGITAL POSITIONING SERVO
Filed May 21, 1957 5 Sheets-Sheet 4

INVENTOR.
WILTON R. ABBOTT
BY
Allan Rothenberg
ATTORNEY

FIG. 10

United States Patent Office

2,886,753
Patented May 12, 1959

2,886,753
DIGITAL POSITIONING SERVO

Wilton R. Abbott, Los Gatos, Calif., assignor to North American Aviation, Inc.

Application May 21, 1957, Serial No. 660,574

18 Claims. (Cl. 318—28)

This invention relates to digital servos and more particularly to a digital servo for rapidly moving a driven element to a desired position specified by a coded digital signal.

Basic operations of a digitally controlled automatic machine tool may include movement of the workpiece or worktable relative to a tool in a predetermined path as, for example, in contour cutting and also relative movement of tool and workpiece to a predetermined position as, for example, in drilling or positioning the workpiece relative to the tool for the start of a contouring operation. These two operations, positioning and contouring, involve different driving concepts for optimum operation. For accurate contour cutting, each instantaneous position must be precise, and a pair of servo drives on at least two different axes must be carefully time synchronized. Precision contouring is best achieved with a proportional type servo drive utilizing a drive signal proportion to the difference between a command signal and a signal indicative of the actual position or motion. The error counter used in such proportion servo will provide a fine instantaneous position control by the use of digital to analog summing networks and thus for high precision the error counter capacity is relatively limited. A suitably precise error counter may have a capacity of about 32 units of distance, provided by five stages of the reversible binary counter, whereby rates of change of speed and direction are severely limited. For positioning, on the other hand, only the final position is of concern and the path traversed to obtain this position is of no interest. Such positioning may be effected at speeds limited solely by the machine tool itself. Thus, for a machine tool having a contour controlling error counter of five stages, there may be used a position controlling counter of as many as nineteen stages having a capacity of $2^{19}$ units and high speed drive may be used.

In accordance with the present invention, there is provided a digital control system embodying a pair of parallel servo loops. The first loop may comprise a proportional type error counter for controlling contouring and for holding the machine in a predetermined position while the second loop may comprise a position counter of much greater capacity for producing the high speed positioning drive signals. The position loop embodies a digital comparator for sequentially comparing order by order the digits of corresponding order of a pair of numbers respectively indicative of desired position and actual position. In the positioning mode, the command number and position number are compared by first comparing corresponding digits of highest order or greatest significance. If such comparison indicates coincidence of these digits, comparison of the next lower order is effected and this operation is continued until comparison indicates lack of coincidence in an order being compared. At this time, a drive signal of appropriate sense is utilized to move the workpiece or machine tool rapidly whereby a gauge attached thereto is caused to pulse the position counter so as to change the number stored therein until coincidence of the digits of the order being compared is obtained. Comparison of the next lower order is then effected. This operation continues until a total comparison circuit connected to provide a signal when coincidence of the digits of all ranks or of a relatively large number of highest rank orders is achieved. The total coincidence signal may be utilized to initiate control of position by the error counter of the other servo loop which error counter had been zeroed during the positioning operation. As the position comparison steps down toward lower orders, affording assured coincidence of all higher orders, it is apparent that the actual position error is of a relatively diminished magnitude and the speed of position drive effected by lack of coincidence of such lower orders may be accordingly decreased. Thus, a maximum speed of movement to a position indicated by the command signal is achieved while the precision and fine control of the error counter is not compromised but is utilized to maintain the desired position when it is has been reached.

It is an object of this invention to provide an improved digital control system.

Another object is to effect rapid positioning of a driven element in accordance with a coded signal.

A further object is the control of both the path of movement and final position of a single driven element by each of two parallel servo loops respectively.

Still another object is the provision of a digital servo having combined linear and non-linear control.

Another object is to provide an improved digital comparator.

Still another object is to effect rapid digital comparison of two numbers.

These and other objects of the invention will become apparent from the following description taken in connection with the accompanying drawings, in which.

Figure 1:
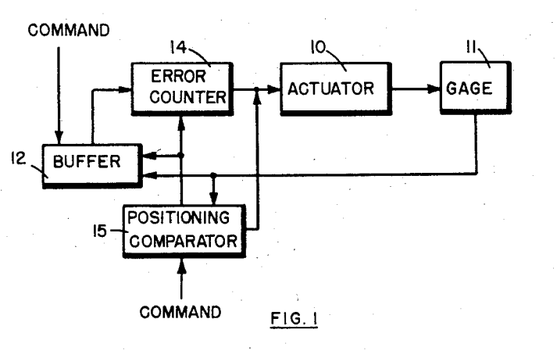
Fig. 1 is a functional block diagram of a dual loop servo system embodying the principles of this invention.

Referring now to Fig. 1, actuator 10 may comprise an electric to mechanical converter such as an electirc valve actuated hydraulic motor or an electric motor providing the desired mechanical output which may be rotation of a motor shaft or linear motion of a worktable. A mechanical motion to electric signal converter such as the gauge 11 is associated with the driven element to provide a number of electric pulses indicative of the mechanical motion. The gauge may be a linear optical gauge mounted on a movable worktable or may be of the tachometer type described hereinafter. Pulses from the gauge are fed to counter 14 through synchronizers or buffer 12 (more particularly described below) which also receives command pulses indicative of a desired output mechanical motion or rate of motion. Reversible binary counter 14 counts the pulses fed thereto and produces an output analog signal which is fed to actuator 10 to effect the desired mechanical output. Thus, the described contouring servo loop will provide an accurate and precise control of instantaneous position for contouring when utilized with a similar error servo drive effecting output mechanical motion in another direction. For rapid positioning there is provided a second servo loop which may include the actuator 10 and gauge 11 but which utilizes a high speed drive positioning counter and comparator 15. Comparator 15 receives pulses from the gauge 11 and also a coded command signal in the form of a binary number indicative of a desired position or total mechanical movement relative to a reference. When the comparator is operated, it feeds a signal to the error counter 14 to hold the latter at zero until the desired position is reached. The output of the positioning comparator is in effect a nonlinear indication of the difference between the command position and the actual position as indicated by the signal from gauge 11. The comparator output is fed to drive the actuator in a sense such as will reduce the position error.

Figure 2:
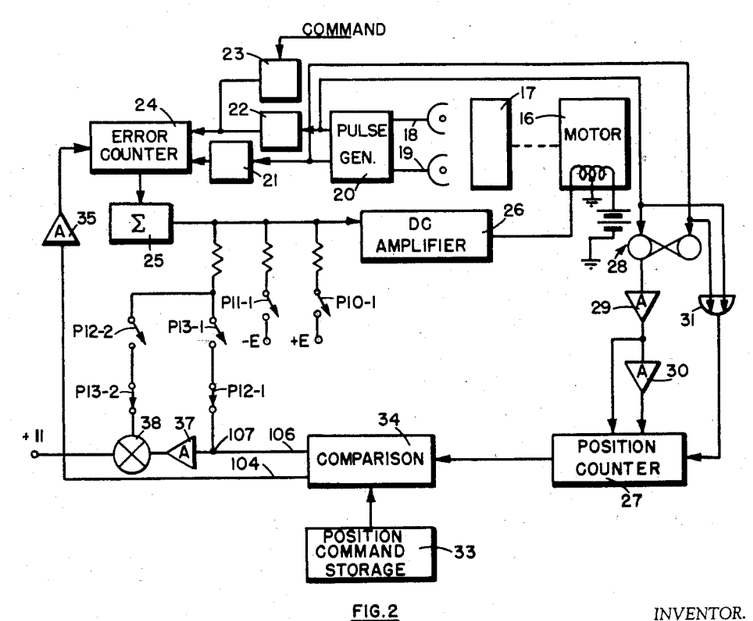
Fig. 2 is a block diagram illustrating the relation of the positioning loop of this invention to an exemplary proportional error counter loop.

As indicated in Fig. 2, the error loop may comprise a digital servo of the type more particularly disclosed in Fig. 9 of Patent No. 2,537,427 for Digital Servo issued January 9, 1951, to E. Seid et al. This servo loop which is merely exemplary of an error control loop which may be utilized with the positioning circuit of this invention, comprises a two-phase motor 16 driving a slotted disk 17, light sensing elements 18 and 19, pulse generator 20, synchronizers 21 and 22 fed from the pulse generator with a pulse for each unit of motion according to the sign thereof, synchronizer 23 receiving command pulses, and reversible binary counter 24 which counts and stores the difference between the number of pulses received from synchronizer 23 and the number of pulses received from the synchronizers 21 and 22. A digital to analog conversion is effected in summing network 25 which sends the error signal to amplifier 26 to drive motor 16 in the appropriate direction. The output shaft of the motor itself may comprise the desired mechanical output or it may be connected to drive a suitable worktable of the machine tool. Elements 17—20 comprise a tachometer type gauge.

The output of pulse generator 20 comprises pulses to synchronizer 22 for motion in one direction and pulses to synchronizer 21 for motion in the other direction. Thus, the error counter 24 will add upon a reception of a pulse from synchronizer 22 and subtract upon reception of a pulse from synchronizer 21. In the positioning loop these add and subtract pulses from pulse generator 20 are fed to a reversible position counter 27 which may be substantially similar to the counter 24. The add and subtract pulses are fed to a flip flop or bi-stable multivibrator 28. An add pulse to the flip flop provides a positive signal to the input of amplifier 29 and negative signal to the input of amplifier 30 and thus a positive add pulse to each stage of the position counter from the output of amplifier 30. A subtract pulse to flip flop 28 provides a negative pulse at the input of amplifier 29 and thus a positive subtract pulse at the output thereof which is fed to the position counter stages. An or gate 31 is coupled to receive both add and subtract pulses from the pulse generator 20 and thus feeds each counting pulse to the position counter which has been set to either add or subtract by reception of the appropriate add or subtract pulse. The digits of a number indicative of a desired position are stored in position command storage 33 and comparator 34 compares the numbers stored in counter 27 and storage 33 order by order. Upon energization of the position circuit, a signal is sent from comparator 34 through amplifier 35 to zero error counter 24. Lack of coincidence in the highest order stages as indicated by comparator 34 is utilized to close relay contacts P10–1 or P11–1 in accordance with the sign of the indicated difference whereby a relatively large source of positive or negative voltage +E or —E is fed to driving amplifier 26. Lack of coincidence in any-one of a predetermined group of lower order stages as indicated by comparator 34 actuates either of a pair of relay contacts P12–1 and P12–2 or a pair of relay contacts P13–1 and P13–2, according to the sign of the indicated difference. It is here noted that all relays are shown in released position. Actuation of relays P13–1 and P13–2 will cause a relatively small negative voltage to be fed from the comparator 34 to amplifier 26, whereas actuation of relay contacts P12–2 and P12–1 will cause a positive voltage of small magnitude to be fed to the amplifier 26. The comparator 34 presents a negative voltage to the input of amplifier 37 to place the output thereof at ground potential which potential is combined with a positive voltage such as +11 volts in summing network 38 which has the output thereof coupled to amplifier 26 through P13–2 and P12–2. Comparator 34 is also arranged to indicate total coincidence of all of the orders of the compared numbers and when this occurs there is fed a signal through amplifier 35 to release the zeroed error counter 24 which at this time will take over control and bring back to the indicated coincidence position the driven element which might otherwise tend to inertially continue its movement.

Figure 3:
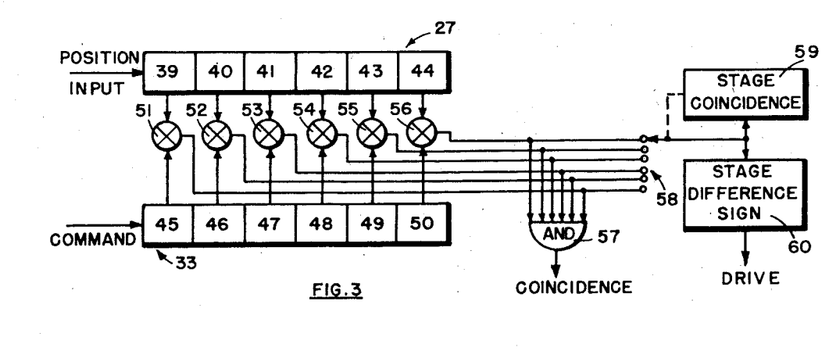
Fig. 3 is a block diagram of the position comparator.

As indicated in Fig. 3, position comparison is achieved by comparison of each of the stages 39 through 44 of reversible position counter 27 with each corresponding stage 45 through 50 of the command storage 33. Comparison networks 51 through 56 are respectively coupled to receive signals indicative of the digits of the corresponding stages respectively individual to each order of the stored numbers. Each comparison network provides an output signal indicative of coincidence of the compared digits and of the sign of the difference, if any. The output of all the comparison networks are fed to a total coincidence circuit 57 which thus has an output when total coincidence is reached. This output is utilized to release the zeroed error counter 24. A stepping switch 58 sequentially couples the output of each comparator or comparison network 51–56, in an order beginning with the highest rank stage, to a stage coincidence network 59 and stage difference sign network 60. Coincidence of the stage to which the stepping switch arm is coupled causes stage coincidence network 59 to effect the stepping of the switch arm to the next lower order. Lack of coincidence of the digits of the stage being compared is sensed in the difference sign network 60 which then produces drive signals of appropriate sign. Output mechanical movement effected by such drive signals produces, by means of the mechanical motion to pulse converter or gauge, a series of position pulses which are fed back to the input of the position counter 27 to thereby change the number stored therein. When this number is changed sufficiently to afford coincidence in the order being compared, the coincidence network 59 actuates the stepping switch. The number of stages shown in Fig. 3 is exemplary only. It is to be understood that any suitable number of stages may be used.

Figure 4:
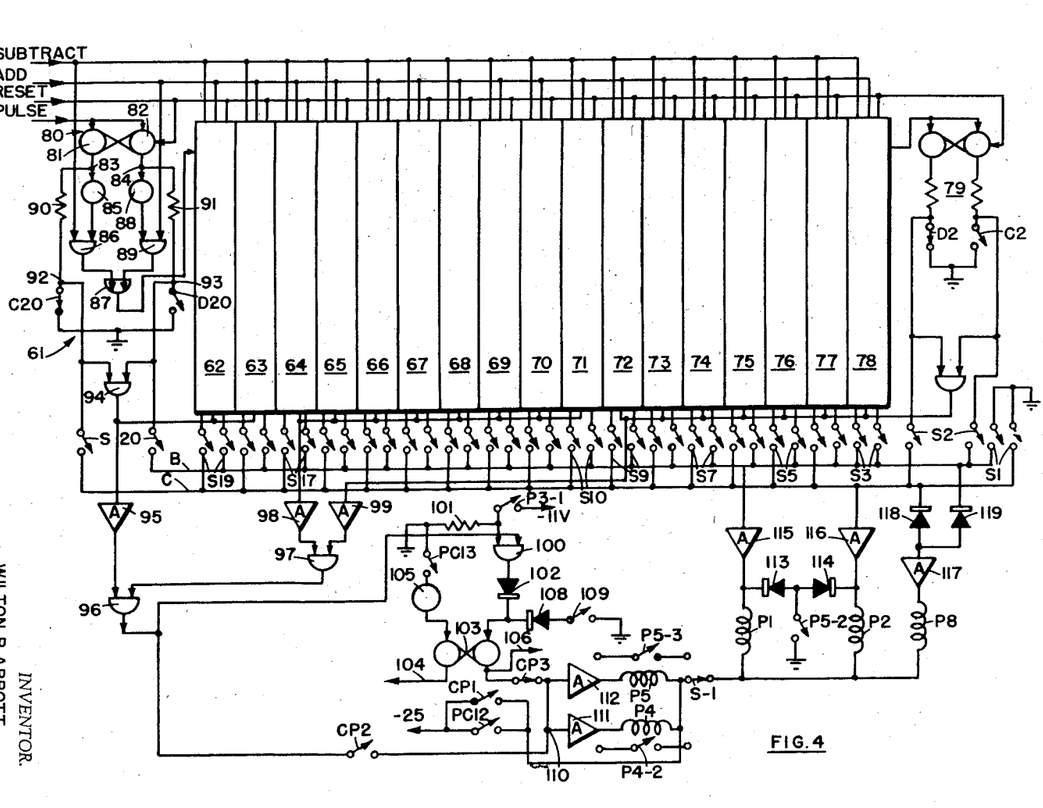
Fig. 4 and Fig. 5 taken together illustrate circuitry of the comparator and the control circuitry thereof.
Figure 5:
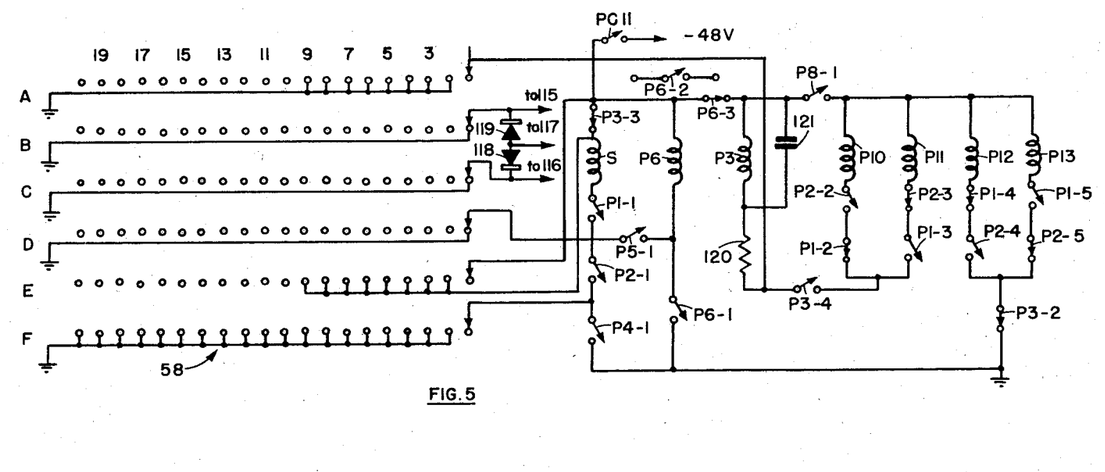
Figure 10:
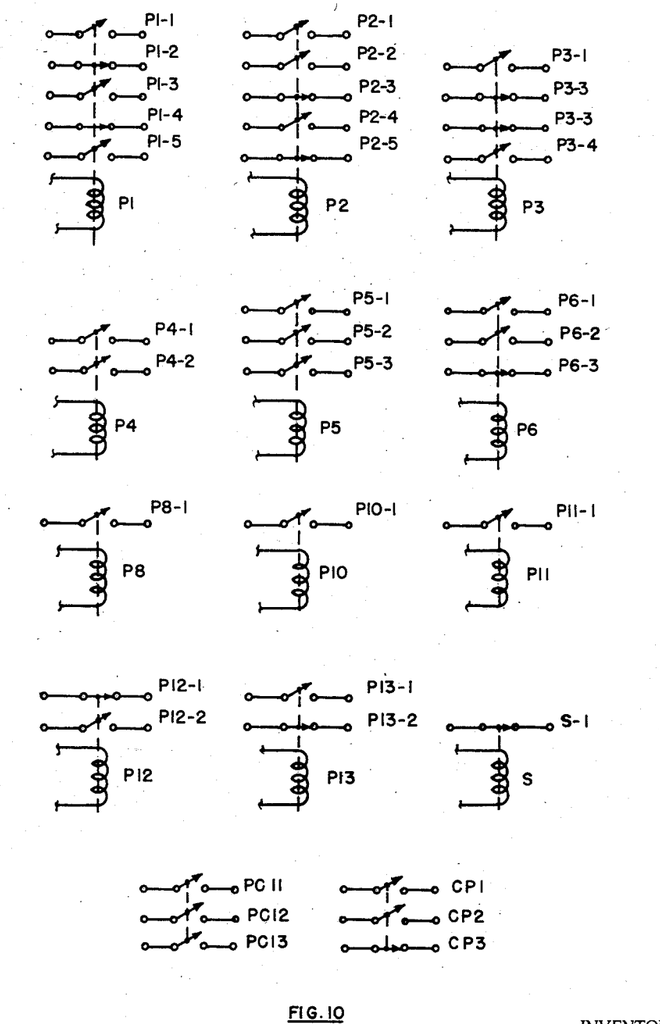

The positioning circuitry basically comprises the counting and comparison circuitry illustrated in the left hand portion of Fig. 3 and the control circuitry illustrated in the right hand portion of Fig. 3. The control circuitry includes a stepping switch, a plurality of relays for actuating the switch and deriving the appropriate drive and coincidence signals and associated amplifiers and coincidence circuits. Figs. 4 and 5 illustrate the electrical connections of the several relays and the elements thereof, but no attempt has been made in these figures to show the mechanical operating connections of the relay contacts in order to avoid confusion of the drawings. Fig. 10, however, does illustrate the operative relation of the various relay contacts. In this figure each set of contacts is shown adjacent to the relay coil which effects actuation thereof. For example, contacts P1–1 through P1–5 are each simultaneously operated from the released position illustrated by the energization of coil P1. Similarly contacts P2–1 through P2–5 are simultaneously operated by energization of coil P2. Switch contacts PC11, PC12 and PC13 are ganged to be simultaneously closed either manually or by a master programming apparatus in order to initiate a positioning operation. Similarly contacts CP1, CP2 and CP3 are operated simultaneously either manually or by the programmer in order to effect the check position operation.

Indicated in Fig. 4 are further details of a position comparator having nineteen stages designated as 61 through 79 inclusive. The position counter comprises a series of flip flops or bi-stable multivibrators 80 and associated circuitry connecting them to provide a reversible binary counter substantially similar in operation to the reversible binary counter disclosed in the above mentioned patent to Seid et al. Each flip flop comprises a pair of bi-stable elements 81, 82 connected to have mutually exclusive states so that, for example, in flip flop state 0, the output of element 81 at point 83 will be negative while the output of element 82 at point 84 will be positive or ground, and in the opposite condition for binary 1, 83 will be ground and 84 negative. The counting pulse from or gate 31, Fig. 2, shifts the binary condition of the flip flop from 0 to 1 and vice versa and of course, shifts the state of each flip flop element. When subtracting, a pulse appears on the subtract line from the output of amplifier 29 in coincidence with the change of the flip flop from 0 to 1. The change of element 81 is fed through differentiator 85 and combined with the subtract pulse in coincidence gate 86 which then feeds a subtract carry pulse through or gate 87 to the counting pulse input of the counter stage of next higher order. When adding, a pulse appears on the add line from the output of amplifier 30 in coincidence with the change of flip flop condition from 1 to 0. The corresponding change of state of element 82 is fed through differentiator 88 and combined with the add pulse in coincidence gate 89 from whence is fed an add carry pulse to the next stage through or gate 87.

The command storage comprises a number of stages equal to the number of position counter stages and each command storage stage comprises a pair of bi-stable elements connected to have mutually exclusive binary states. In the illustrated embodiment each command storage stage comprises a pair of ganged relay contacts such as the first stage pair designated as C20 and D20. It is to be understood that each storage stage comprises a similar pair of relays through and including the highest order stage relays respectively indicated as D2 and C2. In the 0 state all the left hand or C relays of each pair, with the exception of the final stage, are closed while all the right hand or D relays of each pair are open. Each relay has one contact thereof grounded and the other contact thereof coupled to a corresponding counter stage element such as 81 or 82 through resistors such as resistors 90, 91 whereby the states of each pair of corresponding elements of each stage such as, for example, the pair of elements comprising relay element C20 and counter element 81, are continuously compared at points 92 and 93 and corresponding points of the other comparator stages.

Considering the comparison of the first order stage, if the digits stored in the counter and command storage are both 0, point 92 is at ground by virtue of the closed condition of C20 and point 93 is at ground by virtue of the flip flop condition. If the relay is 0 and the flip flop is 1, point 92 is still at ground but point 93 is negative by virtue of the flip flop condition. If the relay is 1 and the flip flop is 0, point 92 is negative by virtue of flip flop condition and point 93 is ground by virtue of relay condition. The output of each pair of comparison circuits at points 92 and 93 are fed to coincidence gate 94 and similar coincidence gates in each stage. The output of the stage coincidence gate 94 and of the corresponding stage coincidence gates of stages 62 and 63 are fed through amplifier 95 to total coincidence gate 96 which also receives the output of coincidence gate 97. The inputs to coincidence gate 97 comprise the outputs of amplifiers 98 and 99 which respectively receive the outputs of the stage coincidence gates (corresponding to gate 94) of stages 64 through 71 and of stages 72 through 79. Thus, if all stages are either 00 or 11 (command storage and flip flop conditions respectively) the inputs to amplifiers 95, 98 and 99 will be at ground and the output of total coincidence gate 96 will be ground, indicating total coincidence. On the other hand, if there is a lack of coincidence in the digits of any stage, one input to the stage coincidence gate thereof will be negative, the input to one of amplifiers 95, 98 and 99 will be negative and the output of total coincidence gate 96 will be negative.

The total coincidence signal from gate 96 comprises one input to coincidence gate 100 which has the other input thereof normally grounded through resistor 101 except when normally open relay contacts P3–1 are closed to supply a negative input to gate 100. A coincidence signal from gate 100 is fed through diode 102 to the right hand element of flip flop 103 which thus keeps the flip flop at binary 0 to produce a negative signal at output 104 thereof. This negative signal on output 104 is fed to amplifier 35 of Fig. 2 to release the zeroing of error counter 24 which zeroing is effected by a ground output on lead 104.

The outputs of comparators 92 and 93 are also fed to the fixed contacts S20 on levels C and B respectively of the stepping switch illustrated in Fig. 5. It is to be understood that the contacts of levels B and C of the stepping switch are illustrated in both Figs. 4 and 5 and are illustrated in Fig. 4 as normally open contacts which are closed when the stepping switch arm is stepped to the particular stage. The lower ends of the contacts S20 as illustrated in Fig. 4 and of the contacts of each of the other switch contacts S19–S1 actually comprise the movable switch arm as more particularly illustrated in Fig. 5. The stepping switch is actuated by energization of coil S, Fig. 5, through position command contacts PC11, P3–3, P1–1, P2–1, to ground through switch level F when not in position 1 or through contacts P4–1 to ground.

Position command or initiation of the positioning operation is effected by closing, manually or otherwise, the position command contacts PC11, PC12, and PC13 which applies excitation from a source of suitable voltage such as the negative 25 and 48 volts indicated to all of the positioner relay coils P1, P2, P3, P4, P5, P6, P8, P10, P11, P12, P13. Closing of PC13 feeds a pulse to the left hand element of flip flop 103 via differentiator 105 to set the flip flop to 1 thus providing a ground signal on output 104 which is fed to amplifier 35 of Fig. 2 to zero each stage of error counter 24. Thus, the flip flop 103 is set and a negative signal appears at the output 106 thereof which is fed to point 107 of the slow speed drive network (Fig. 2) which is to be operated by energization of coil P12 or P13. The error counter 24 is maintained at zero until flip flop 103 is reset. Flip flop 103 may be reset by a total coincidence signal from gate 96, unless contacts P3–1 are operated by coil P3 or by a clear fault signal applied through diode 108 by manual operation of clear fault switch 109. Coil P4 is operated (energized) when flip flop 103 is set by the negative signal which thus appears at point 110 to operate amplifier 111. When flip flop 103 is reset, point 110 is ground and amplifier 112 effects operation of coil P5.

If coincidence exists when the position command contacts PC11, PC12, and PC13 are operated, flip flop 103 will set due to the pulse applied thereto via differentiator 105 and PC13 but will reset immediately by virtue of the coincidence signal from coincidence gate 100. This operation is quite fast and therefore coil P4 will not have a chance to operate. Coil P5 will operate by virtue of the ground input at point 110 to amplifier 112. Coils P1 and P2 are then operated by the feeding of a ground signal through operated contacts P5–2, diodes 113 and 114, normally closed contacts S–1 and PC12. If the stepping switch is not at position or step 1, the home position, contacts P1–1 and P2–1 (Fig. 5) operated by coils P1 and P2 will energize stepping switch coil S which opens contacts S–1 cocking the switch, and de-energizes coils P1 and P2 to release the switch and cause it to step. This operation will continue until the stepping switch gets home when the normally grounded switch arm of level F is floating to prevent further stepping. If as is more likely, the stepping switch is home upon operation of the position command contacts, it stays there. At home, coil P6 is operated through PC11, P5–1, and switch level D or contacts P6–1 whereby an in position signal is derived in a circuit (not shown) which is closed by operation of contacts P6–2. Contacts P6–3 are opened by energization of P6 thereby preventing energization of coils P3, P10, P11, P12, and P13. It is to be understood that the switch movement is in a sequence from any position to the position of next highest number and from position 20 to position 1.

If on the other hand, coincidence does not exist when the PC contacts are operated, flip flop 103 sets, zeroing the error counter 24 and operating coil P4. Coils P1 and P2 are energized by means of the ground input to amplifiers 115 and 116 respectively from switch levels B and C at home position (contacts S1 closed). Operation of P1 and P2 steps the stepping switch as described above, and at this point the circuit examines the comparison of the most significant stage 79 of the position counter with its command storage relay.

It is here noted that this highest stage is indicative of the sign of the numbers stored respectively in the counter and command storage relays and, because of the peculiarity in the disclosed exemplary embodiment that a 1 in this stage of the storage relay represents a minus sign, the flip flop outputs are reversed from those of the other stages. As described above this reversible counter is substantially similar in operation to that described in the above mentioned patent to Seid et al. For an indication of 0 on the counter all stages but that of the highest order, stage 79, are 0 while the highest order stage is 1. A 0 in the latter indicates a negative number stored in the counter. For a zero number stored in the command storage relays, all stages without exception are 0. A 1 in the highest order stage of these relays indicates a minus. Therefore, it will be seen that coincidence of the last ranks of the counter and the storage relays is uniquely indicated by 10 or 01 in counter storage and command storage respectively.

To continue with the comparison operation, if there is a disagreement, either P1 or P2 will be released by the negative signal on the arm of either level B or C and P8 will be operated by the output of amplifier 117 which receives a negative input through either of diodes 118, 119, from the negative signal appearing on the arm of either level B or C. The sign of the disagreement determines which one of P1 and P2 operates. In any case, coil P3 is operated through closed contacts P6–3, resistor 120, and the switch arm of level A in any one of switch positions 2 through 9 inclusive. Energization of P3 operates contacts P3–1, P3–2, P3–3 and P3–4 which together with operation of contacts P8–1 by coil P8 permits the operation of either one of high speed drive coils P10 and P11 in accordance with the operation of contacts P2–2 and P2–3 by coil P2 or contacts P1–2 and P1–3 by coil P1. Thus, either P11–1 or P10–1 (Fig. 2) is operated to cause high speed motion in the appropriate direction. It is noted that P8 does not operate if there is coincidence initially. When motion has progressed enough to cause coincidence in this stage, or if this stage was in coincidence at the start, coil P8 is or remains released due to the ground input to amplifier 117 and coils P1 and P2 both operate due to the ground input to both amplifiers 115 and 116. This causes the stepping switch to step one stage and examination of the comparison of the digits of the next lower stage is effected.

This operation proceeds through stepping switch positions 2 through 9 inclusive. During this period, coil P3 is operated by the ground connection of level A keeping contacts P3–1 closed and thus preventing resetting of flip flop 103 even if coincidence is crossed. This is effected by the feeding of a negative voltage through contacts P3–1 to coincidence gate 100. Thus, the error counter is locked out during high speed drive which cannot be handled by the error counter. On step 10 coil P3 releases after a predetermined delay determined by capacitor 121, connected across the coil, which delay must be long enough for the high speed operation which may have been occurring to stop completely. Because of relay operating and release times, the high speed motion may continue for a relatively large distance even after the comparison indicates coincidence. But this distance is not sufficient to again change the condition of counter stage 72 which is arranged to have a digital order value indicative of a movement greater than the inertial movement of the high speed drive release time. When coil P3 releases on step 10, high speed drive coils P10 and P11 are locked out by opening of contacts P3–4, contacts P3–2 are closed and slow drive coils P12 and P13 are in condition to be energized by energization of P1 or P2 which operate contacts P1–4, P1–5 and P2–4, P2–5 respectively. Further, the release of contacts P3–1, Fig. 4, allows the flip flop 103 to be reset if coincidence should now occur whereby the error counter 24 will be released to take over control upon the occurrence of coincidence. The operation of comparing successive stages of decreasing order continues in the same manner as that described in connection with switch positions 2 through 9 with the exception that the high speed drive is replaced by a drive of much lower speed. Whenever total coincidence is sensed in this portion of the positioning operation, positioning drive is released, and the flip flop 103 is reset putting the error counter into control and stepping the stepping switch home as described above. The error counter is at zero when it obtains control and since it is receiving no command signals, its output will be proportional to the gauge pulses which indicate the amount of movement beyond the coincidence position whereby the error counter will bring the machine back to coincidence and hold it at the desired position. It is noted that the clear fault contacts 109 may be utilized to interrupt positioning by providing a signal which in effect simulates total coincidence.

It will be readily appreciated that if positioning is acceptable which is accurate to a degree on the order of the distance indicated by the first two or three lowest rank stages of the position counter, the amplifier 95 which indicates coincidence of each of the first three counter stages may be eliminated or de-energized whereby indicated coincidence will be accurate to an error not greater than the value indicated by the order of the fourth counter stage.

The positioning circuit described has a second function in addition to the described function of actually effecting desired machine position. The circuitry also provides for obtaining a position check which may be useful if a rapid check of accuracy of the actual machine position is desired. For the check position operation contacts CP1, CP2, CP3 are actuated manually or otherwise while the PC contacts remain released. Operation of the CP contacts supplies power to P1, P2, P4, P5, and P8 and also causes total coincidence information from total coincidence gate 96 to be fed directly to the inputs of amplifiers 111, 112 through CP2. If there is total coincidence, point 110 is ground and P5 operates, closing relay contacts P5–3 which are connected in a circuit (not shown) arranged to signal coincidence in the check position operation. If there is not total coincidence, point 110 is negative, coil P4 operates to close contacts P4–2 which are connected in a circuit (not shown) to yield an indication of position error. Contacts P5-3 and P4-2 may simply operate appropriate signal lights or may feed further information to the master programmer of the system.

It is noted that there is a possibility that the pulse from the gauge which caused the position comparison to indicate complete coincidence may be fed to the error counter 14 (Fig. 1) and may be counted thereby after the error counter zero is released. This is possible due to a delay in the error counter line which may cause storage of such a pulse for an appreciable period. The buffer 12 is arranged to avoid this possible discrepancy. The signal from the position comparator which zeros the error counter is also fed to zero the buffer which is released simultaneously with release of the error counter by total coincidence indicated in the positioning comparator.

Figure 6:
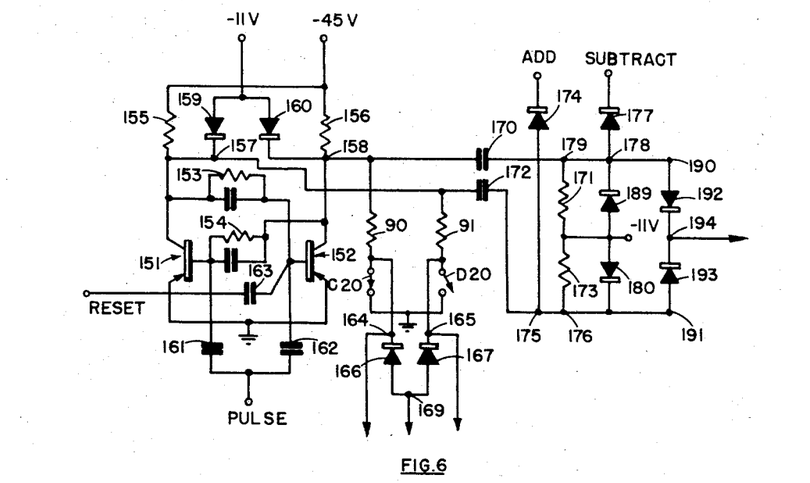
Fig. 6 is a circuit diagram of an exemplary stage of the position counter of Fig. 4, Figs. 7, 8, and 9 illustrate exemplary amplifiers which may be utilized in the circuit of Fig. 4, and Fig. 10 comprises a schematic illustration of the arrangement of the several relay coils and the respective relay contacts and switches.

Illustrated in Fig. 6 is the detail circuitry of an exemplary stage of the position comparator. The flip flop 80 and the other flip flops heretofore described may comprise a pair of grounded emitter transistors 151, 152, having parallel resistance capacitance networks 153, 154 connecting the collector of each to the base of the other. The collectors may be coupled to a source of negative voltage such as, for example, negative 45 volts through resistors 155 and 156 respectively while the output of each transistor at points 157 and 158 of the respective collectors (corresponding respectively to points 83, 84, of Fig. 4) are clamped to a source of negative voltage such as for example, negative 11 volts, by means of diodes 159, 160 when the respective transistors are cut off. During conduction of either transistor the collector output terminal thereof is at ground. The counting pulse may be fed to both bases by input capacitors 161, 162, to effect a change of condition of the flip flop. A reset pulse (synchronously applied to each corresponding flip flop element) may be applied via capacitor 163 to the base of transistor 152 to place the flip flop in binary 0 state with transistor 152 conducting and transistor 151 cut off. The respective collector output terminals are resistance coupled to command storage relay elements C20 and D20 as previously described whereby the signals to levels B and C of the stepping switch may be obtained at points 164 and 165 respectively. The stage coincidence gate 94 of Fig. 4 comprises a pair of diodes 166 and 167 coupled to resistors 90, 91 as shown whereby there appears at point 169 a ground signal only if both points 164 and 165 are ground. The change of state of each transistor appearing at points 157 and 158 is differentiated in differentiators comprising capacitor 170, resistor 171, and capacitor 172, resistor 173 respectively. The add signal is fed through diode 174 to point 175 which together with point 176 comprise the inputs to the coincidence gate corresponding to gate 89 of Fig. 4. The subtract pulse is fed through diode 177 to point 178 which together with point 179 comprise the inputs to the coincidence gate corresponding to gate 86 of Fig. 4. These gates include diodes 180 and 189 respectively connected between a negative source of potential such as negative 11 volts and the respective gate outputs. The gate outputs are fed to the inputs 190, 191, of an or gate comprising diodes 192 and 193 and having an output terminal 194 from which is derived the carry pulse which is fed to the counter stage of next highest order.

Figure 7:
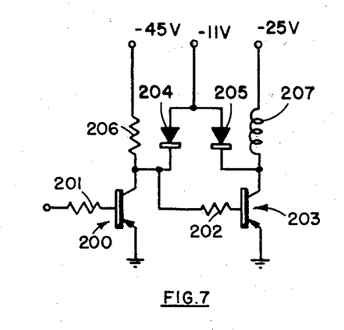
Figure 8:
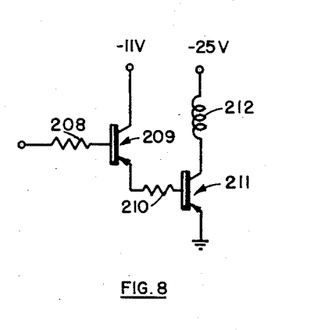
Figure 9:
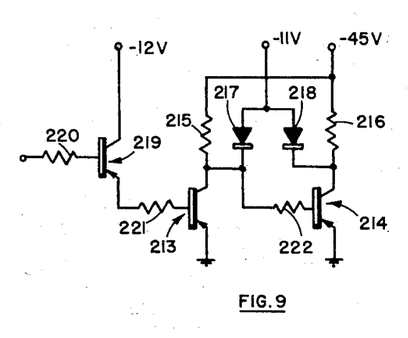

Illustrated in Figs. 7, 8, and 9 are the circuits of exemplary amplifiers which may be utilized in the positioning circuits. Fig. 7 depicts a coil driving amplifier such as amplifiers 112, 115, and 116 of Fig. 4. The base of a grounded emitter transistor 200 receives through resistor 201 an input signal from, for example, the point 110. The collector output of the transistor is coupled through resistor 202 to a second grounded emitter transistor 203. Each collector is coupled through respective diodes 204 and 205 to a source of voltage such as negative 11 volts. The collector of transistor 200 is coupled through resistor 206 to a source of voltage such as negative 45 volts while the driven coil 207 (corresponding to P1, P2 or P5) couples the collector of transistor 203 to a source of voltage such as negative 25 volts. Thus, when conducting, each transistor collector is substantially at ground and when not conducting the respective collectors are clamped to negative 11 volts. Grounding of the input of transistor 200 produces a negative signal at the collector thereof to thereby ground the collector of transistor 203 and coil 207 is energized. With a negative signal at the input to transistor 200 the current through coil 207 is not sufficient for actuation thereof.

The amplifier of Fig. 8 is exemplary of amplifiers 111 and 117 of Fig. 4. The input is fed through resistor 208 to the base of transistor 209 which has the collector thereof coupled to a source of negative voltage such as negative 11 volts. The emitter of transistor 209 is coupled through resistor 210 to the base of grounded emitter transistor 211 which has the coil to be operated, coil 212, connected in the collector circuit thereof. Coil 212 may be, for example, the coil P4 or P8. A negative input to transistor 209 increases the base current drawn through transistor 211 whereby the latter conducts an amount sufficient to energize its collector coil. A ground input to transistor 209 diminishes conduction of both transistors 209 and 211 to maintain the coil de-energized.

Circuitry of amplifiers 95, 98, and 99 of Fig. 4 as indicated in Fig. 9 may comprise a pair of grounded emitter transistors 213, 214 having the collectors thereof coupled to a source of voltage such as negative 45 volts through resistors 215, 216 respectively and also to a source of voltage such as negative 11 volts through clamping diodes 217 and 218 respectively. The collector of transistor 213 is connected to the base of transistor 214 through resistor 222. A driving stage for this amplifier comprises transistor 219 having a base input resistor 220, a collector coupled to a source of voltage such as negative 12 volts and an emitter coupled to the base of transistor 213 through resistor 221. Thus, a ground input to the base of transistor 219 diminishes conduction of both transistors 219 and 213 whereby a negative signal at the collector of transistor 213 increases conduction of transistor 214 to place the collector output of the latter substantially at ground.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A servo system comprising an electrical to mechanical converter for producing an output mechanical movement in response to an electrical input thereto, gauge means for generating a number of pulses indicative of said movement, error counting means for receiving said gauge pulses and a series of input motion pulses and for generating a drive signal indicative of the difference between said input and gauge pulses, means responsive to said drive signal for actuating said converter, position counting means responsive to said gauge pulses for storing a position number indicative of the magnitude of said movement, a source of digital position command signal, means for comparing said command signal with said position number, means responsive to said comparing means for energizing said converter actuating means, and means responsive to said comparing means for disabling said error counting means.

2. A dual servo system comprising a first servo loop including an electrical to mechanical converter for producing a mechanical output and an electrical output as a predetermined function of said mechanical output, comparator means responsive to said electrical output and adapted to receive a motion signal input for producing an error signal indicative of the difference between the inputs thereto, and means responsive to said error signal for energizing said converter; a second servo loop including said converter and said converter energizing means, second comparator means for receiving said electrical output and adapted to receive a position signal input for producing a drive signal indicative of the relation between said electrical output and said position signal and means for feeding said drive signal to said converter energizing means; and means for simultaneously energizing said second loop and de-energizing said first loop.

3. The system of claim 2 wherein said second comparator comprises means for storing the digits of a number indicative of the magnitude of said mechanical output relative to a reference, said position signal comprising means for storing the digits of a number indicative of a desired position relative to said reference, and means for sequentially comparing corresponding digits of said numbers to produce said drive signal.

4. A positioning servo comprising motor means for moving a driven device to a predetermined position, means for generating an electrical output signal as a predetermined function of motion of said device, means responsive to said signal for storing the digits of a position number indicative of the position of said device, means for storing the digits of a command number indicative of said predetermined position, means for generating a drive signal sequentially indicative of the sense of the difference between corresponding digits of successive like orders of said command and position numbers, and means responsive to said drive signal for energizing said motor means.

5. A digital comparator comprising a first storage device for storing the digits of a first number, a second storage device for storing the digits of a second number, and means for sequentially comparing order by order the digits of corresponding order stored in respective ones of said devices.

6. A digital comparator comprising means for storing according to digital order the digits of each of a pair of numbers to be compared, means for deriving signals respectively indicative of the relative magnitudes of digits of each pair of stored digits of corresponding order, and output means for sequentially providing an indication of each of said signals in a sequence starting with the highest order digits of each said number.

7. The structure of claim 6 including means for providing an indication of total coincidence of corresponding digits in a predetermined plurality of highest orders of said numbers.

8. In a digital servo system, means for storing according to digital order the digits of a pair of numbers, means for sequentially comparing corresponding digits of individual orders of said pair of numbers, means responsive to said comparing means for changing one of said stored numbers to effect coincidence of the corresponding digits of the order being compared, and means responsive to said comparing means and coincidence in the order being compared for actuating said comparing means to effect comparison of corresponding digits of next lower order.

9. The system of claim 8 including means for simultaneously comparing corresponding digits of each of a predetermined group of orders of said numbers.

10. A digital comparator comprising a counter having a plurality of stages for respectively storing the digit of each order of a first number, storage means having stages corresponding to said counter stages for respectively storing the digit of each order of a second number, a plurality of comparators respectively individual to each order of said numbers and coupled to corresponding stages of like order of said counter and storage means, output means, and means for sequentially coupling said output means to each of said comparators in a sequence starting with the highest order of said numbers.

11. The comparator of claim 10 including means responsive to said output means for effecting coincidence of the digits in the order of the comparator to which said output means is coupled, and means responsive to said output means for actuating said sequential coupling means.

12. The comparator of claim 10 including second output means coupled to each of a predetermined group of said comparators.

13. The comparator of claim 12 including coincidence checking means for energizing said second output means and maintaining de-energization of said first output means.

14. A binary comparator comprising first and second bistable devices each comprising a pair of bistable elements connected to have mutually exclusive states, means for comparing the states of the elements of at least one pair of corresponding elements of respective devices, means for detecting coincidence of said compared states, and means responsive to said comparing means for detecting the sense of the difference between the states of at least one pair of corresponding elements.

15. A binary comparator comprising a pair of bistable devices each having a pair of conditions respectively indicative of a pair of binary digits, each device comprising a pair of bistable elements connected to have mutually exclusive states, said devices including means for providing first and second pairs of signals, each of said signals representing one state of one of said elements, means for comparing the signals of said first pair of signals, means for comparing the signals of said second pair of signals, coincidence means coupled to both said comparing means for indicating coincidence of the conditions of both said devices, and means responsive to at least one of said comparing means for indicating the sense of the relative conditions of said devices.

16. A digital servo comprising a reversible binary counter having a plurality of stages of successively increasing order for storing a position number, a binary command storage device having a plurality of stages respectively corresponding to said counter stages, each of said stages comprising a pair of bistable elements connected to have mutually exclusive states, a plurality of comparison circuits respectively individual to each pair of corresponding elements of each of said stages and respectively coupled to the elements of its associated pair of elements, a driven mechanism, direction sensitive means for driving said mechanism, a coincidence circuit, switch means for sequentially coupling comparison circuits individual to successive pairs of stages of corresponding order to said driving means and to said coincidence circuit, means responsive to said coincidence circuit for effecting sequencing of said switch means, gauge means responsive to said mechanism and coupled with said counter for changing the number stored therein in accordance with the position of said mechanism, and total coincidence means coupled with each comparison circuit of a group including the comparison circuits of a predetermined number of highest order stages.

17. A binary comparator comprising a first binary storage device having a plurality of stages of successively increasing order for storing a first number, a second binary storage device having a plurality of stages respectively corresponding to the stages of said first device, each of said stages comprising a pair of bistable elements connected to have mutually exclusive states, a plurality of comparison circuits respectively individual to each pair of corresponding elements of each of said stages and respectively coupled to the elements of its associated pair of elements, a coincidence circuit, switch means for sequentially coupling comparison circuits individual to successive pairs of elements of corresponding order to said coincidence circuit, means responsive to said coincidence circuit for effecting sequencing of said switch means, and total coincidence means coupled with each comparison circuit of a group including the comparison circuits of a predetermined number of highest order stages.

18. A dual loop servo system comprising a first servo loop for effecting an output motion of a driven device in accordance with the difference between said output motion and a first predetermined input indicative of a desired motion, a second servo loop for effecting motion of said device in accordance with the sense of the difference between the position of said device and a second input indicative of a desired position, and means for effecting mutually exclusive operation of said first and second loops.

References Cited in the file of this patent

UNITED STATES PATENTS 2,537,427    Seed et al. _______________ Jan. 9, 1951

FOREIGN PATENTS 1,110,544    France _________________ Oct. 12, 1955